July 15, 1969   A. S. NICHOLAS   3,455,603
SEAT MOUNTED RETRACTOR HOUSING
Filed Sept. 11, 1967
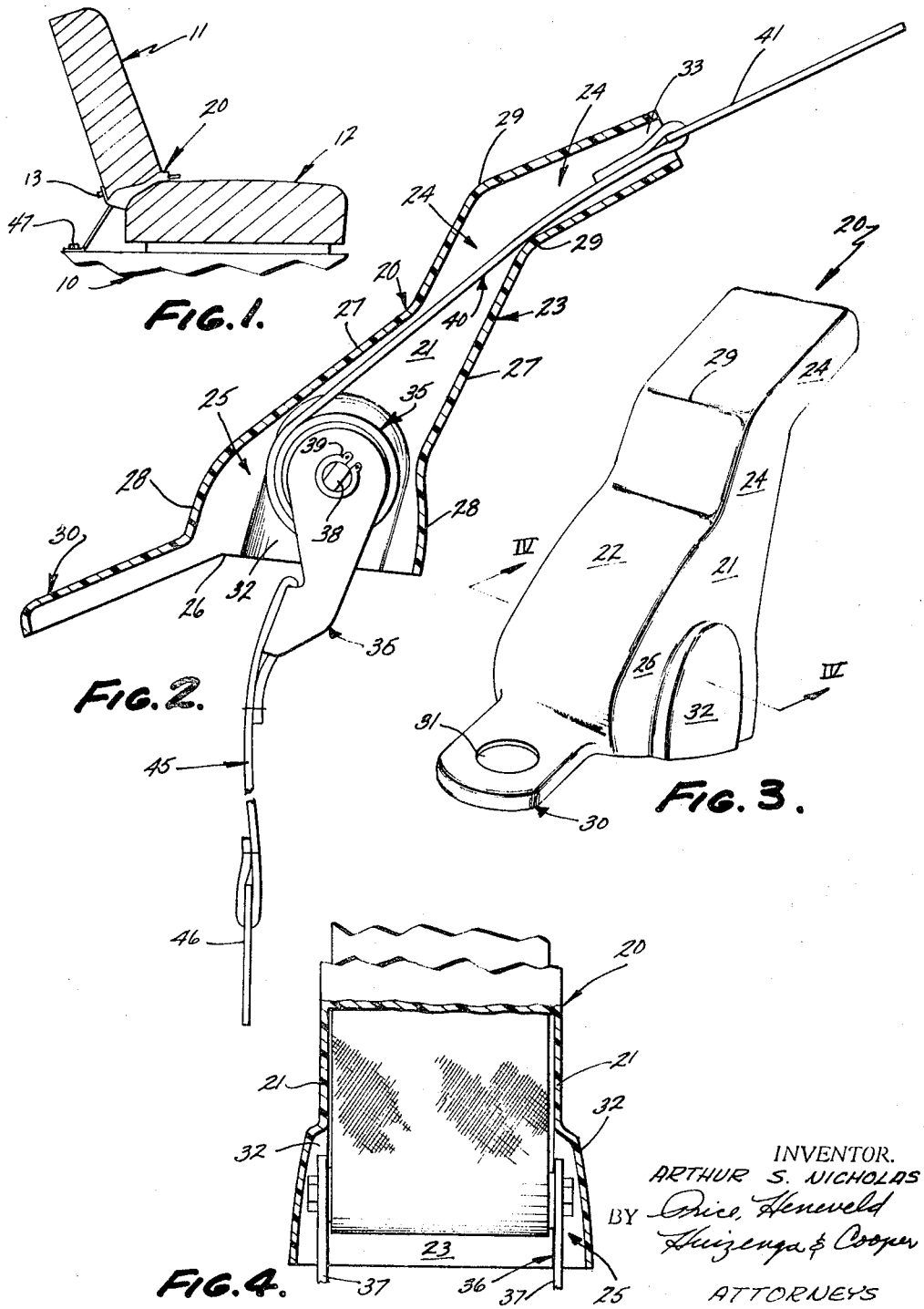
INVENTOR.
ARTHUR S. NICHOLAS
BY Price, Heneveld,
Huizenga & Cooper
ATTORNEYS United States Patent Office 3,455,603
Patented July 15, 1969

3,455,603
SEAT MOUNTED RETRACTOR HOUSING
Arthur S. Nicholas, Grand Rapids, Mich., assignor, by mesne assignments, to U.S. Industries, Inc., a corporation of Delaware
Filed Sept. 11, 1967, Ser. No. 666,712
Int. Cl. B60r 21/10
U.S. Cl. 297—388         7 Claims

ABSTRACT OF THE DISCLOSURE

A retractor housing-tunnel structure adapted to nest between the backrest and the seat of a vehicle having a tunnel portion and a retractor chamber integrally formed from material having limited flexibility to prevent damage to the upholstery and, yet, sufficient rigidity to prevent crushing of the tunnel and chamber into contact with the belt and retractor. Within the retractor chamber is positioned a roll-up retractor secured to the floor of the vehicle by means of a section of webbing. A second section of webbing, retractably associated with the retractor, extends through the tunnel and out the space between the backrest and the seat.

Background

This invention relates to retractor housings and, more particularly, to a novel retractor housing-tunnel structure particularly adapted for use in combination with a vehicle safety belt.

One of the problems which has plagued the transportation industry continuously since the first use of restraining belts has been the provision of means to store the belts when they are not in use. Such storage means are desirable for a number of reasons. First, and most importantly, if the belt is permitted to merely lie loose on the seat, a substantial danger of its being caught in the door or between other operative components of the vehicle and, thus, markedly weakened, exists. Second, as larger numbers of seat belts have become required by law in each vehicle, it has become necessary to provide some means of separating and identifying the various belt extremities within the vehicle so that the passenger may quickly and easily select the proper belt components for his safety. Finally, of course, such storage means are desirable from an aesthetic standpoint and improve the appearance of the vehicle interior markedly when utilized.

It has become customary, therefore, in the transportation art to provide a spring biased, roll-up retractor member on at least some of the belts within an automobile and to store this retractor, when possible, in a shielding boot. Many types of boots have been designed for this storage purpose and, in those situations where the belts are affixed to the vehicle frame adjacent one of the doors thereof, a number of satisfactory solutions have been achieved. A problem which has continued to plague the industry, however, occurs when the belt must pass beween the backrest and the seat at a point intermediate the extremities thereof. In this situation, as has been recognized by the prior art, it is desirable to provide some type of tunnel through the space between the back and seat in order to prevent fouling of the belt due to the compressive forces exerted thereon from these two automotive components (see, for example, United States Patent No. 3,163,467 dated December 29, 1964). Attempts to utilize such tubes or tunnels in conjunction with retractors, however, have resulted invariably in relatively large, bulky items which not only occupy a great amount of otherwise usable space behind the seat but, additionally, provide a constant threat of injury from tripping during boarding and unloading of the vehicle.

Objects and specification

It is an object of this invention, therefore, to provide a retractor housing-tunnel structure which is not subject to the disadvantages outlined above.

More particularly, it is an object of this invention to provide an integrally formed retractor housing-tunnel structure of such configuration as to not interfere to a great extent with ordinary utilization of the rear portion of the vehicle.

It is an object of this invention, additionally, to provide such a structure which, although offering ideal advantages in use, may be fabricated relatively simply and inexpensively and, thus, which may be economically incorporated into automobiles of all descriptions, both new and old.

These as well as other objects of this invention will be readily understood by reference to the following specification and accompanying figures in which:

FIG. 1 is a fragmentary, cross-sectional view of an automobile seat and backrest illustrating the novel retainer housing in position therein;

FIG. 2 is a sectional, side-elevational view of the novel retainer housing-tunnel structure showing the retainer and belt in position therein;

FIG. 3 is a perspective view of the novel retainer housing-tunnel structure; and, FIG. 4 is a cross-sectional view taken along line IV—IV of FIG. 3.

Briefly, this invention comprises a vehicle having a seat and cooperating backrest between which the housing is positioned in nesting fashion. The housing has a forward tunnel section and a rear retainer chamber, the retainer chamber having sufficient room therein to accommodate at least the retractor and the webbing section to be drawn into stored configuration therewith. A first webbing section having a connector portion affixed to one extremity thereof and having a remote portion thereof affixed to the retractor passes through the tunnel. Means are provided additionally for affixing the retractor to a suitable anchoring point within the vehicle.

Referring now to the figures, a preferred embodiment of this invention will be described in detail. Referring initially to FIG. 1, there is illustrated a conventional vehicle interior, for example, that of an automobile, having a floor indicated generally by the reference numeral 10. To the floor are affixed a seat 12 and cooperating backrest 11 in conventional fashion. As will be readily apparent from this figure, the novel retractor housing-tunnel structure 20 is nestably received between the lower portion of the backrest 11 and the upper rear portion of the seat 12. It is affixed in this position by means such as screw 13 passing through a suitable tongue and into the backrest 11 as will be discussed in more detail hereinafter.

Referring now additionally to FIGS. 2 through 4, the structure 20 comprises a pair of spaced sidewalls 21, a top 22 and a bottom 23. The forward section of the structure 20 forms a curved tunnel portion indicated generally by the reference numeral 24, the two relatively straight portions thereof being curvedly joined as indicated at 29. The rear portion of the structure 20 forms the retractor chamber, indicated generally by the reference numeral 25, which is bounded at the top and bottom by diverging portions 27 and partially enveloping portions 28. Retractor chamber 25 is open at the lower end thereof as indicated by the reference numeral 29. Opening 29 permits insertion of the retractor into chamber 29 during assembly of the device. Its downward orientation renders the retractor invisible from the rear seat during utilization of the device.

The securing tongue 30, also formed integrally with the structure 20, extends outwardly from the rearward, upward portion of the chamber 25. The tongue 30 has an aperture 31 therein to assist in securing the structure into position between the seat 12 and its associated backrest 11.

The enlarged storage chamber 25 is provided with two rearwardly open retaining slots or tracks 32. Into these slots through the open back section 26 of the structure 20 is passed a conventional retractor assembly indicated generally by the reference numeral 35. The retractor assembly has a U-shaped frame member 36 incorporating side members 37. The side members support a shaft 38 retained by keepers 39 about which is resiliently journalled a belt-received drum and fastening means as is well-known in the art.

The upper webbing or belt section 49 is passed through the forward mouth 33 of tunnel portion 24 and a conventional connector member 41 adapted to latchably interfit with a mating connecting member on another belt affixed thereto. The connector member 41 is wider than the mouth 33 of the tunnel 24 and serves as a stop when the belt has been retracted to the position shown in FIG. 2. This prevents, of course, the passage of the connector 41 into the tunnel 24 from which it would be accessible only with extreme difficulty.

The retractor assembly 35 is anchored to the floor by means of a separate webbing section, indicated generally by the reference numeral 45, which is looped and sewn about the leg portion of U-shaped frame member 36. The lower extremity of webbing section 45 has a conventional anchor plate 46 affixed thereto in like fashion and it is secured to the frame of the vehicle through the floor by means of a conventional bolt 47.

The entire structure 20 is fabricated from a material having limited flexibility and, yet, sufficient rigidity to prevent crushing of the tunnel portion 24 and retractor storage chamber 25 by compression between the seat and backrest. Such crushing would be highly undesirable, of course, since it would tend to cause the belt to foul within the tunnel or the chamber and thus render access to it difficult. The structure can be fabricated suitably by fusing a plastisol such as polyvinyl chloride about a properly designed aluminum mold. The limited flexibility of such materials when properly chosen greatly decreases the chance of tearing the upholstery of the automobile or other vehicle during installation of the assembly. The broader concepts of this invention envision, of course, the fabrication of the structure from any suitable organic or inorganic material by any suitable forming technique.

The open end 26 of the storage chamber 25 and the rearwardly opening slots 32 allow the retractor assembly to be inserted into its storage chamber 25 with minimum ease during fabrication of the assembly. The ends of the shaft 38 and the nuts or other fasteners thereon, if any, are received by the slots 32 which function in conjunction with their forward limits to keep the retractor assembly relatively centrally located within the chamber 25 and, thus, permit it to operated with minimum friciton between the interior surface of the chamber 25 and the webbing 40.

As the occupant seats himself in the vehicle, it is necessary only to grasp the connector plate 41 and pull upon it whereupon the retractor assembly 35 will reel out the webbing 49. Should an impact be encountered, the force will be transmitted directly to the frame of the vehicle from webbing section 40 to webbing section 45 via the retractor assembly 35 in conventional fashion. When the belt has been released from the occupant, the retractor assembly 35 will cause it to roll back to the position shown in FIG. 2 where it will remain in an attractive, out-of-the-way location until it is again utilized by an occupant of the vehicle.

While a preferred embodiment of this invention has been illustrated in detail, it will be readily apparent to those skilled in the art that many other embodiments may be conceived and fabricated without departing from the spirit and scope of this invention.

I claim:
1. In a vehicle having a seat and a cooperating backrest, the combination comprising:
a first webbing section having a connector portion affixed to one extremity thereof and a retractor affixed to a portion thereof spaced from said connector, said retractor being adapted to bias at least a portion of said first section into a generally confined storage configuration; an integral retractor housing-tunnel member nested substantially entirely between the lower portion of said backrest and the upper rear portion of said seat, said member having a tubular tunnel portion at the forward section thereof and a retractor storage chamber at the rear section thereof, said tunnel portion being of a size sufficient to pass said first webbing section but not the connector affixed thereto to limit retraction of said belt, said storage chamber being of a size sufficient to accommodate at least said retractor and said first webbing section when said first webbing section is in said confined configuration, said member being formed from a material having limited flexibility to prevent damage to the upholstery within said vehicle and yet, sufficient rigidity to prevent sufficient deflection of said tunnel portion and said chamber under the influence of said seat and backrest to foul said retractor and first webbing section therewith; and means affixing said retractor to a suitable anchoring point within said vehicle.

2. The combination as set forth in claim 1 wherein said chamber has an opening at the rear thereof of sufficient size to receive said retractor into said chamber.

3. The combination as set forth in claim 1 wherein said retractor is of the roll-up type and wherein the sides of said chamber include means for maintaining said retractor centrally located with respect to said chamber, said retractor remaining within said chamber during reeling out and retraction of said first webbing section.

4. The combination as set forth in claim 1 wherein said member further comprises means associated therewith for fastening said member to one of said seat and backrest members.

5. The combination as set forth in claim 4 wherein said fastening means comprises a tongue integrally formed with said member and extending rearwardly from the upper portion of said chamber, said tongue being adapted to be fastened to the rear lower portion of said backrest.

6. The combination as set forth in claim 1 wherein said affixing means comprises a second webbing section non-retractably affixed to said retractor and exiting from said member through an aperture in the chamber thereof toward said anchoring point.

7. The combination as set forth in claim 2 wherein said opening faces downwardly when said members is so nested between said backrest and said seat.

References Cited
UNITED STATES PATENTS

| | | | |
|---|---|---|---|
| 3,203,641 | 8/1965 | McFarlane et al. | 242—107.4 |
| 3,287,063 | 11/1966 | Nicholas | 297—388 |
| 3,325,212 | 6/1967 | Dillender | 297—388 |
| 3,343,764 | 9/1967 | Webb | 297—388 X |

CASMIR A. NUNBERG, Primary Examiner

U.S. Cl. X.R.
280—150; 297—385